(12) United States Patent
Kontola (10) Patent No.: US 7,257,153 B2
(45) Date of Patent: Aug. 14, 2007

(54) METHOD OF SYNCHRONIZING A RECEIVER, AND A RECEIVER

(75) Inventor: Ilkka Kontola, Julkujärvi (FI)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 09/732,961

(22) Filed: Dec. 8, 2000

(65) Prior Publication Data

US 2001/0004381 A1 Jun. 21, 2001

(30) Foreign Application Priority Data

Dec. 9, 1999 (FI) ................................. 19992653

(51) Int. Cl.
*H04B 1/69* (2006.01)
(52) U.S. Cl. ...................... 375/150; 375/149; 375/232; 375/279; 375/148; 342/357; 342/383
(58) Field of Classification Search ................ 375/149, 375/340, 140, 147, 150, 208, 232, 279, 148; 341/61; 342/283, 357, 383
See application file for complete search history.

(56) References Cited

U.S. PATENT DOCUMENTS

| | | | | |
|---|---|---|---|---|
| 4,785,463 A | * | 11/1988 | Janc et al. | 375/147 |
| 5,192,957 A | | 3/1993 | Kennedy | 342/357 |
| 5,373,531 A | | 12/1994 | Kawasaki | 375/1 |
| 5,812,090 A | | 9/1998 | Chevalier et al. | 342/378 |
| 6,005,889 A | * | 12/1999 | Chung et al. | 375/140 |
| 6,011,812 A | * | 1/2000 | Laakso et al. | 375/152 |
| 6,026,130 A | * | 2/2000 | Rahmatullah et al. | 375/340 |
| 6,166,690 A | * | 12/2000 | Lin et al. | 342/383 |
| 6,462,682 B2 | * | 10/2002 | Hellberg | 341/61 |

FOREIGN PATENT DOCUMENTS

| | | |
|---|---|---|
| EP | 0 809 376 A2 | 11/1997 |
| EP | 0 971 485 A1 | 1/2000 |
| FI | 102340 B | 11/1998 |
| WO | WO 87/01540 | 3/1987 |
| WO | WO 97/14057 | 4/1997 |

OTHER PUBLICATIONS

Muramatsu and Kiya, Extended Overlap-Add and -Save Methods for Multirate Signal Processing,Sep. 1997,IEEE, vol. 45, p. 2376-2380.*
"Direct-Sequence Spread Spectrum Acquisition Using Transform Domain Processing" Thomas A. Brown, Oct. 11, 1993, pp. 1018-1022.
"Improved Search Algorithm for Fast Acquisition in a DSP-based GPS Receiver" Flavio Daffara et al., Sep. 29, 1998, pp. 310-314.
"Digital Signal Processing", Ifeachor et al., pp. 183-250, Sep. 2001.

* cited by examiner

*Primary Examiner*—Chieh M. Fan
*Assistant Examiner*—Eva Zheng
(74) *Attorney, Agent, or Firm*—Perman & Green, LLP (57) ABSTRACT

The invention relates to a method for synchronizing a receiver (1) with a transmitted code-modulated spread spectrum signal. The method uses at least one reference code (r(x)), which corresponds to a code used in the modulation. The frequency shift of the transmitted signal and the code phase of the code used in the modulation are determined in the method.

67 Claims, 8 Drawing Sheets

METHOD OF SYNCHRONIZING A RECEIVER, AND A RECEIVER

BACKGROUND OF THE INVENTION

The present invention relates to a method for synchronizing a receiver with a transmitted code-modulated spread spectrum signal, in which method at least one reference code (r(x)) is used, the reference code corresponding to a code used in the modulation, a frequency shift of the transmitted signal and a code phase of the code used in the modulation is determined, a receiver which comprises at least a synchronization means for synchronizing the receiver (1) with a transmitted code-modulated spread spectrum signal, the receiver (1) having means (16) for using at least one reference code (r(x)) in connection with synchronization, which reference code (r(x)) corresponds to a code used in the modulation, and means (15) for determining a frequency shift and a code phase of the code used in the modulation, and an electronic device which comprises at least a positioning receiver (1), synchronization means for synchronizing the positioning receiver (1) to a transmitted code-modulated spread spectrum signal, the positioning receiver (1) having means (16) for using at least one reference code (r(x)) in connection with the synchronization, the reference code (r(x)) corresponding to a code used in the modulation, and the electronic device comprising means (15) for determining the frequency shift of the transmitted signal and the code phase of the code used in the modulation.

The GPS system (Global Positioning System) is a well known positioning system, which comprises over 30 satellites, of which a maximum of 12 satellites are simultaneously visible to a receiver. These satellites transmit various information, such as Ephemeris data and clock data parameters which describe the satellite clock and its relationship to GPS time. Normally, the receiver used in positioning determines its location by calculating the transit time of signals transmitted simultaneously from several satellites of the positioning system to the receiver. To determine its location, the receiver must typically receive the signal of at least four visible satellites in order to be able to calculate the location.

Each operational satellite of the GPS system transmits a so-called L1 signal at a carrier frequency of 1575.42 MHz. This frequency is also denoted $154f_0$, where $f_0=10.23$ MHz. In addition, the satellites transmit an L2 signal at a carrier frequency of 1227.6 MHz, that is $120f_0$. In the satellite, these signals are modulated with at least one pseudo-random sequence. Each satellite has a different pseudo-random sequence. As a result of modulation, a code modulated wideband signal is formed. This modulation technique makes it possible for the receiver to distinguish between signals transmitted by different satellites, despite the fact that the carrier frequencies used in the transmission are essentially the same. This modulation technique is called Code Division Multiple Access (CDMA). One of the pseudo-random sequences used in each satellite for the modulation of the L1 signal is so-called C/A code (Coarse/Acquisition code), which is so-called-Gold code. Each GPS satellite transmits a signal using a unique C/A code. The codes are formed as the modulo 2 sum of two 1023-bit binary sequences. The first binary sequence G1 is formed using the polynomial $X^{10}+X^3+1$, and the second binary sequence G2 is formed by delaying the polynomial $X^{10}+X^9+X^8+X^6+X^3+X^2+1$ so that each satellite has a different delay. This arrangement enables the generation of different C/A codes with a similar code generator. The C/A codes are binary codes, the chipping rate of which in the GPS system is 1.023 MHz. The C/A code comprises 1023 chips, which means that the repetition time of the code is 1 ms. The carrier wave of the L1 signal is further modulated with navigation information at a bit rate of 50 bit/s. The navigation information comprises information about the "health" of the satellite, its orbit and clock data parameters, etc. Each satellite of the GPS system maintains a local time by e.g. atomic clocks.

During operation, the satellites monitor the condition of their equipment during operation. For example, satellites can use so-called watch-dog functions to detect faults in the equipment and provide notification about them. Errors and malfunctions can be either momentary or long-term in nature. On the basis of the health information, some of the errors can be possibly compensated for, or the information transmitted by a malfunctioning satellite can be ignored entirely. In addition, in a situation in which the signals of more than four satellites can be received, information received from different satellites can be weighted in different ways on the basis of the health information. Thus it is possible to minimize errors that satellites which seem to be unreliable may cause in the measurements.

In order to detect the satellite signals and to identify the satellites, the receiver must perform a synchronization operation, in which the receiver searches for the signal of each satellite and tries to synchronize with the signal so that the data transmitted with the signal can be received and demodulated.

Figure 2A:
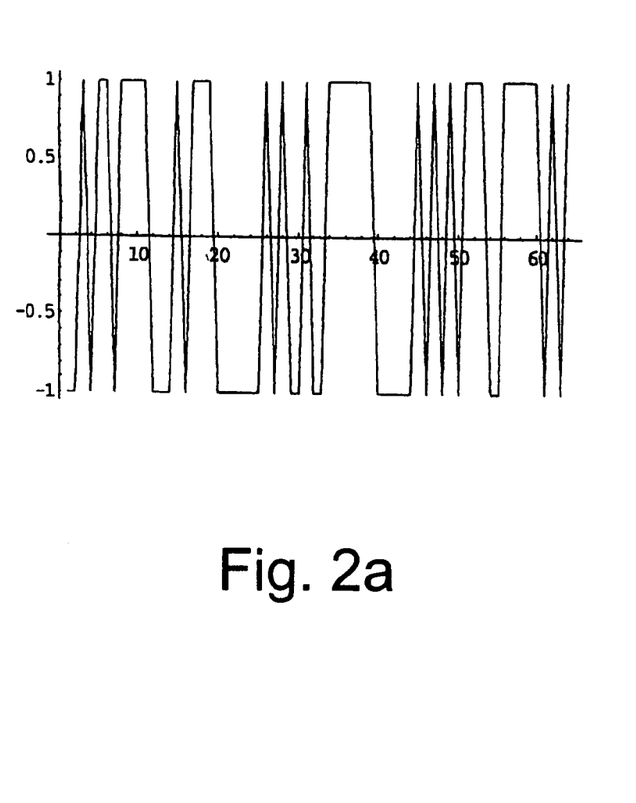
FIG. 2a shows the signal transmitted from the satellite as a simplified diagram.
Figure 2B:
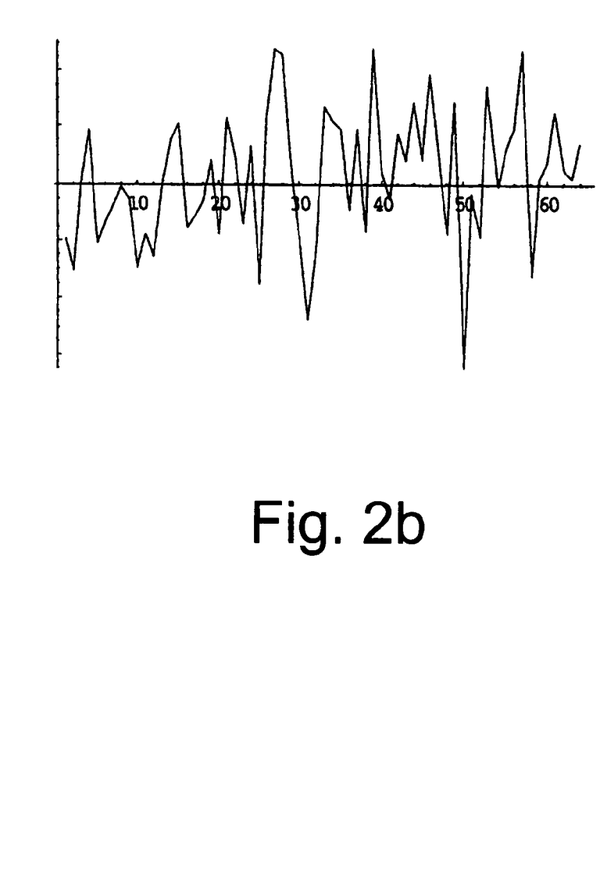
FIG. 2b shows an example of the simplified signal of FIG. 2a in a receiver.

In prior art receivers, the time required for this synchronization operation depends among other things on the strength of the received signal. Typically, the weaker the signal to be received, the longer each element of the search space (correlation/frequency) must be integrated in order to detect a possible signal. In prior art GPS receivers, which are typically designed for outdoor use, synchronization with the satellite signals takes some tens of seconds or a few minutes, if the received signal is relatively strong, e.g. in the range of −120 to −130 dBm. However, if positioning is to take place indoors or in a place where the received signal is attenuated by buildings or other obstacles in the terrain, the synchronization time increases substantially. Indoors the signal strength is typically approx. −150 dBm, whereby the time needed for synchronization using a sequential search would be hours. This time is clearly too long for performing a reasonable positioning. FIG. 2a illustrates, by way of example, a CDMA signal transmitted from a satellite, and correspondingly FIG. 2b illustrates this transmitted signal when it reaches the receiver. The signal to be received has been attenuated substantially on the transmission link, and it contains accumulated noise.

The positioning receiver must perform synchronization when, for example, the receiver is switched on, and also in a situation where the receiver has not been able to receive the signal of any satellite for a long time. A situation like this can easily arise in mobile devices, for example, because the device moves and the antenna of the device is not always in an optimal position in relation to the satellites, which weakens the strength of the signal arriving at the receiver. In urban areas, buildings also have an effect on the received signal, and in addition, can cause so-called multipath propagation in which the transmitted signal arrives at the receiver via several different routes, for example straight from the satellite (line-of-sight) and also reflected from buildings. As a result of this multipath propagation, the same signal is received as several signals with different phases.

The positioning system has two main functions:
1. calculating the pseudo range of the receiver to different GPS satellites, and
2. determining the location of the receiver using the calculated pseudo ranges and the satellite position information. At any given time the satellite position information can be calculated on the basis of the ephemeris data and time correction information received from the satellites.

The distances to the satellites are called pseudo ranges, since the time is not known accurately in the receiver. In that case the determination of location and time is repeated, until a sufficient accuracy of time and a sufficient accuracy of location has been achieved. Since the time is not known with absolute accuracy, the location and time must be determined by linearizing a set of equations for each new iteration.

The calculation of the pseudo range can be performed by measuring the average apparent transit times of the different satellite signals. After the receiver has synchronized with the received signal, the information transmitted in the signal is demodulated.

Almost all known GPS receivers use correlation methods for calculating the ranges. The pseudo random sequences of different satellites are stored or are generated locally in the positioning receiver. A down conversion is performed on the received signal, whereafter the receiver multiplies the received signal with the stored (or locally generated) pseudo random sequence. The signal formed as the result of the multiplication is integrated or low-pass filtered, whereby the result indicates whether the received signal contains a signal transmitted by a satellite. The multiplication carried out in the receiver is repeated so that each time the phase of the pseudo random sequence saved in the receiver is shifted. The correct phase is estimated from the correlation result preferably in such a way that when the correlation result is the highest, the correct phase has been found. In this way the receiver is correctly synchronized with the received signal.

After synchronization with the code has been performed, the frequency is fine tuned and phase locking is carried out. The correlation result also reveals the information transmitted in the GPS signal, which means that it is a demodulated signal.

The above mentioned synchronization and frequency adjustment process must be repeated for each satellite signal received at the receiver. Therefore, this process consumes a lot of time especially in a situation where the received signals are weak. In some prior art receivers, several correlators are used in order to accelerate this process, whereby more correlation peaks can be searched for simultaneously. In practical applications, it is not possible to accelerate the synchronization and frequency adjustment process very much by simply increasing the number of correlators, because thir number cannot be increased indefinitely.

Some prior art GPS receivers use an FFT technique to determine the doppler shift of the received GPS signal in connection with ordinary correlators. In these receivers, correlation is used to reduce the bandwidth of the received signal to 10 kHz-30 kHz. This narrow-band signal is analyzed using FFT algorithms to determine the carrier frequency.

A GPS receiver and a method for processing GPS signals are presented in international patent application WO 97/14057. Principally, the receiver presented in this publication comprises two separate receivers, of which the first receiver is intended for use in a situation where the received signal strength is sufficient, and the second receiver is intended for use in a situation where the received signal strength is insufficient to perform a sufficiently accurate determination of position using the first receiver. In the second receiver, the received signal is digitized and stored in a memory means, whereby these stored signals are later processed in a digital signal processing unit. The digital signal processing unit performs convolution operations on the received, digitized signal. The purpose of these convolution operations is to calculate pseudo ranges. The number of code sequences (PM frames) stored in the memory means typically ranges from one hundred to thousand, which corresponds to a signal having a length of 100 ms to 1 s. After this, a stored code corresponding to the code of a satellite to be examined is retrieved from the memory of the receiver to be used in the analysis of the received signal.

The Doppler shift is also removed in the receiver. The amount of Doppler shift is determined using either the first receiver or on the basis of information received from a base station of the GPS system. After this, consecutive frames are coherently summed. A fast Fourier transform is performed on the data set produced as the result of this summing. A multiplication is performed on the Fourier transform result, using the complex conjugate of the Fourier transform of the reference signal stored in the memory means. An inverse Fourier transformis further performed on the result of this multiplication, whereby a number of correlation results are received. Thus, in this publication, a correlation is replaced by a Fourier transform, whereby the number of calculations is reduced. According to the specification, the method accelerates positioning by a factor of 10 to 100 compared with the solutions known at the time of filing the application.

SUMMARY OF THE INVENTION

It is an objective of the present invention to provide a receiver, in which synchronization with a transmitted signal can be performed substantially faster than in prior art receivers, even if the signals are weak. The invention is especially suited for use in positioning receivers, as well as in other receivers, advantageously in CDMA receivers, where the receiver must synchronize with a spread spectrum signal. The invention is based on the idea that the frequency analysis properties of convolution and time-to-frequency transformation, such as the fast Fourier transform, are utilized more efficiently, whereby it is possible to examine a greater amount of information simultaneously than in prior art solutions, that employ the Fourier transform. A method according to the present invention is characterized in by the which is set forth in the characterizing part of claim 1. A receiver according to the present invention is characterized by that which is set forth in the characterizing part of claim 17. An electronic device according to the present invention is characterized by that which is set forth in the characterizing part of claim 32.

The present invention provides considerable advantages compared with prior art methods and receivers. Especially in positioning receivers, the method according to the invention enables the receiver to become synchronized with the received signal faster. In this way positioning can be performed much faster, even in situations where the received signal is weak, for example indoors or in urban areas where there are obstacles that substantially attenuate the propagation path of the signal. The method according to the invention provides a substantial improvement in the synchronization speed when compared with prior art methods. The receiver according to the invention can be implemented using a relatively small number of components, and the total energy consumption can be maintained at a reasonable level, whereby the invention is especially suitable for use in portable devices. Thus the positioning receiver can also be implemented in connection with a mobile station.

DESCRIPTION OF THE DRAWING

In the following, the present invention will be described in more detail with reference to the accompanying drawings, in which.

DETAILED DESCRIPTION OF THE INVENTION

Figure 1:
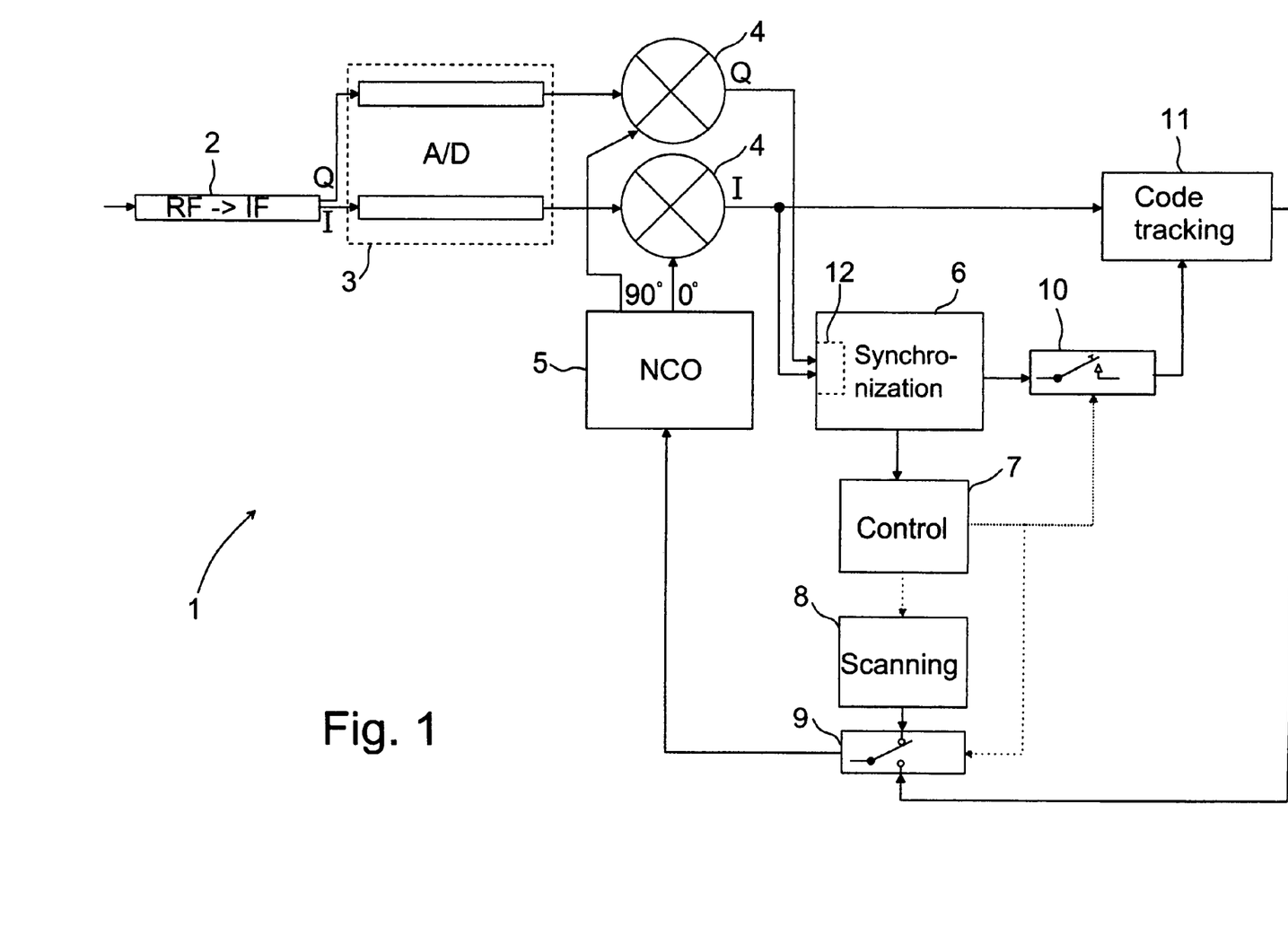
FIG. 1 is a simplified block diagram of a receiver, in which the method according to the invention can be applied.

In the receiver 1 shown in FIG. 1, the received signal is preferably converted to an intermediate frequency in the converter block 2. As is well known, at this stage, the signal comprises two components, I and Q, between which there is a phase difference of 90° C. These intermediate frequency converted analogue signal components are digitized in digitizing block 3 and conducted to multiplier block 4. In the multiplier block 4, the I and Q components of the digitized signal are multiplied with the signal generated by the Numerically Controlled Oscillator (NCO) 5. The numerically controlled oscillator signal is intended to correct the frequency difference caused by the Doppler shift and the frequency difference of the local oscillator (not shown) of the receiver 1. The numerically controlled oscillator 5 is also used in connection with the method according to the invention, as will be described later in this description. The signal formed by the multiplier block 4 is conducted to the synchronization block 6, where the method according to the invention is applied. The synchronization block 6 tries to find the code phase and frequency deviation of the satellite to be used in operations performed after the synchronization. This will also be described later in this description. During synchronization, the control block 7 controls the scanning block 8 which adjusts the frequency of the numerically controlled oscillator 5 as required. The control block 7 causes the first switch 9 to connect either the signal formed by the scanning block 8 to the numerically controlled oscillator 5 during synchronization or the control signal formed by the code tracking block 11 to the numerically controlled oscillator 5 when synchronization has been achieved. The second switch 10 is used to control the operation of the code tracking block 11. The code tracking block 11 forms part of a code phase locked loop and a carrier phase locked loop (not shown), which are known as such.

After switching on the operating voltage, or in a situation where the receiver 1 has been unable to receive the GPS satellite signals for a long time, a two-dimensional search step is carried out in the receiver 1 for each satellite signal received. The purpose of the two-dimensional search is to determine the carrier frequency and code phase of each satellite. The carrier frequency is affected by the Doppler shift resulting from the movement of the satellite and inaccuracies of the local oscillator of the receiver. The frequency inaccuracy can be rather large, as much as ±6 kHz, in which case the receiver must search a frequency range of approximately 12 kHz with respect to the actual transmission frequency (L1=1575.42 MHz). The receiver 1 does not know the exact code phase, either, whereby the receiver must also determine the code phase from 1023 possible code phases. This gives rise to a two-dimensional search process, in which frequency deviation in the range of 12 kHz and a code phase out of 1023 different code phases are searched. In a method according to a preferred embodiment of the invention it is possible to examine a frequency range of approximately 500 Hz at a time, whereby the method is repeated 24 times if necessary, to cover the whole frequency range of 12 kHz to be examined. Obviously, the values used in this specification only serve as examples which clarify the invention, but do not constitute a limitation thereof. The invention can also be applied systems other than GPS systems, in which case the frequency values, code phases and the number of codes can vary.

In the following, the operation of a method according to a preferred embodiment of the invention in a receiver 1 according to FIG. 1 will be described. In order to start synchronization, the scanning block 8 sets the frequency of the numerically controlled oscillator 5 so that the receiver advantageously receives the lowest frequencies of the frequency range, which are in this example 1575.414 MHz-1575.4145 MHz. The receiver can also specify the starting frequency in such a way that it utilizes previously determined location information and/or almanac information, whereby the positioning can be further accelerated. Samples of the received signal are saved in sample vector formation block 12 preferably as complex sample vectors $p_k(1)$, $p_k(2) \ldots p_k(N)$, each of which comprises 1023 samples in this preferred embodiment. In this preferred embodiment, the rate at which samples are stored in the sample vector formation block 12 is essentially the same as the chipping rate of the chips, which is approx. 1,023,000 samples a second. The sample vectors are continuous so that one sample vector continues temporally after another sample vector, that is the time difference between the last sample of the previous sample vector and the first sample of the next sample vector is essentially the same as the time difference between consecutive samples of the sample vector. Thus, the 1023 samples correspond to a signal of 1 ms, which corresponds to a frequency range of 1 kHz of which a part can be utilized. The sample vector formation step is denoted with the reference number 101 in the appended FIG. 3.

The number of sample vectors is preferably N, where N is advantageously a power of two. In addition, in a preferred embodiment of the invention the formation of sample vectors is repeated K times, as will be described later in this specification. In the following, the subscript k is used to denote different repetitions. When defining the number N of sample vectors $p_k(1)$, $p_k(2) \ldots p_k(N)$, it must be taken into consideration that in the GPS system the signal is modulated with information at a bit rate of 50 bits/s as binary phase modulation. Another factor, which limits the number N of sample vectors $p_k(1)$, $p_k(2)$ ... $p_k(N)$, is the frequency stability of the receiver's local oscillator.

In addition to the sample vector formation step, the synchronization method according to the invention also comprises a correlation step in which a correlation function matrix is formed.

Figure 3:
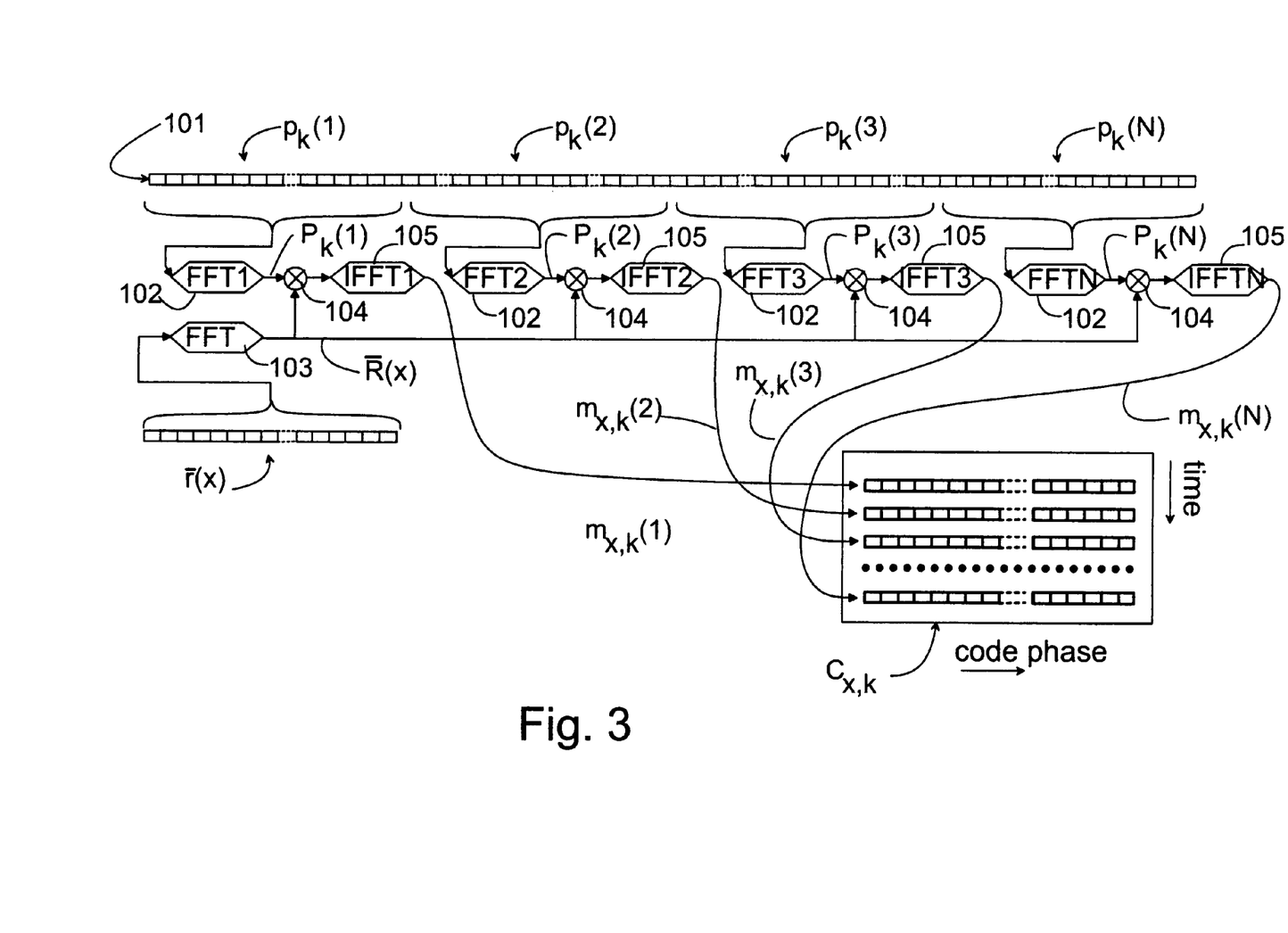
FIG. 3 shows the correlation step of a method according to a preferred embodiment of the invention as a simplified diagram.

The correlation step can be partly performed already during sampling, or after N sample vectors $_{pk}(1)$, $p_k(2)$ ... $p_k(N)$ have been formed. If the correlation step is performed for example in such a way that a time-to-frequency transformation, such as a Fast Fourier Transform (FFT), is calculated for each sample vector after it has been saved, the same time-to-frequency transformer can be used for all N sample vectors $p_k(1)$, $p_k(2)$ ... $p_k(N)$. If, on the other hand, the correlation step is performed after N sample vectors have been saved, a separate time-to-frequency transformer must be used for each sample vector, or the time-to-frequency transformations are performed for different sample vectors consecutively using the same time-to-frequency transformer. FIG. 3 shows the correlation step of the method, in which a correlation function matrix $C_{x,k}$ is formed from the sample vectors $p_k(1)$, $p_k(2)$ ... $p_k(N)$. Although the Fourier transform is mainly used as an example of a time-to-frequency transformation throughout this description, and the inverse Fourier transform is used as an example of an inverse transformation, that is a frequency-to-time transformation, it is obvious that this invention is not limited to these examples only.

A discrete Fourier transformation 102, most preferably a fast Fourier transform, FFT, is performed on each sample vector $p_k(1)$, $p_k(2)$ ... $p_k(N)$.

$$P_k(i) = \text{FFT}(p_k(i)), \text{ where } i=1, \ldots, N \qquad (1)$$

This is illustrated by blocks FFT1, FFT2, ..., FFTN in FIG. 3. In practice, the number of values used in calculations is preferably 1024, because then the discrete Fourier transformation can be implemented in practical applications much more efficiently (with an FFT algorithm) than when 1023 values are used. One way of doing this is to add an extra zero as the 1024th element. This has a minor effect on the transformation result.

Preferably, the reference codes r(x) corresponding to the C/A codes of all the satellites of the GPS system are stored in the receiver, where x refers to the satellite identifier and is, for example, in the range 1-36. It is not necessary to store the reference codes, but they can also be generated in the receiver. In the correlation stage, the reference code of the satellite transmitting the signal with which the receiver is being synchronized at a particular time is selected or generated. The reference code is temporally reversed. A discrete Fourier transformation 103, most preferably a fast Fourier transform (FFT) is performed on the reversed reference code, which is denoted by $\bar{r}(x)$ in FIG. 3.

$$\bar{R}(x) = \text{FFT}(\bar{r}(x)) \qquad (2)$$

The reversed reference code $\bar{r}(x)$ and/or its FFT transform may have been saved in the memory means of the receiver in advance, or it is formed from the reference code r(x) in connection with the synchronization process.

In the next step of the correlation stage a multiplication 104 is performed between the Fourier transformation result $P_k(i)$ for each sample vector $p_k(i)$ and the Fourier transformation $\bar{R}(x)$ of the reversed reference code $\bar{r}(x)$.

$$M_{x,k}(i) = \bar{R}(x) \cdot P_k(i) \qquad (3)$$

An inverse Fourier transformation 105 is performed on the results of these multiplications, whereby the result is a cross-correlation of the reference code r(x) and the received signal with all possible integer delays (1023).

$$m_{x,k}(i) = i\text{FFT}(M_{x,k}(i)) \qquad (4)$$

This result is based on the fact that the Fourier transformation of the convolution of time domain signals corresponds to the multiplication of Fourier-transformed signals, that is time domain signals transformed into the frequency domain. When a reversed reference code is also used, a fast discrete time correlation can be performed using a Fourier transform. Thus, in this preferred example, the cross-correlation result comprises 1023 elements. The cross-correlation results $m_{x,k}(i)$ formed from the various sample vectors $p_k(i)$ are used to form a correlation function matrix $C_{x,k}$, in which the number of rows is the number N of sample vectors.

It is obvious that instead of temporal reversal of the reference code, it is possible to form reversed sample vectors $\bar{p}_k(i)$ from the sample vectors $p_k(i)$, in which case the reference code r(x) is used directly and the reversed sample vectors are used in the calculations presented above. In a preferred embodiment, it is not necessary to perform either of the reversals mentioned above, but the reference code r(x) and the sample vectors $p_k(i)$ can be used as such. This is based on using a property of the correlation theorem, which shows that the cross-correlation $\text{corr}(z_1, z_2)$ between two time discrete functions $z_1$, $z_2$ can be formed by means of a frequency-to-time transformation of frequency domain transformed functions. This can be represented with the following expression:

$$\text{corr}(z_1, z_2) \propto \text{IFFT}(Z_1^* \cdot Z_2) \qquad (5)$$

Thus, in a preferred embodiment of the invention, it is possible to form the cross-correlation between the sample vectors $p_k(i)$ and the reference code r(x) by performing a Fourier transform (most suitably a fast Fourier transform FFT) on the sample vectors $p_k(i)$ and the reference code r(x) to form a Fourier transform $P_k(i)$ of the sample vector $p_k(i)$ and a Fourier transform R(x) of the reference code r(x), forming the complex conjugate $P^*_k(i)$, of the Fourier transform $P_k(i)$ of the sample vector, multiplying the formed complex conjugate $P^*_k(i)$ with the Fourier transform R(x) of the reference code and performing an inverse Fourier transform on the multiplication result. Alternatively, a complex conjugate $R^*(x)$ can be formed from the Fourier transform R(x) of the reference code, in which case it is multiplied with the Fourier transformation $P_k(i)$ of the sample vector, whereafter an inverse Fourier transformation is performed on the multiplication result.

In this connection, it should be emphasized that the method for calculating the cross-correlation between the sample vectors and the reference code r(x) presented in the previous paragraph is a consequence of the basic properties of correlation and convolution and the close dependence between them, whereby reversal of a function in the time domain is practically equivalent to the formation of a complex conjugate in the frequency domain. This is dealt with in more detail e.g. in the publication: "Digital Signal Processing—A Practical Approach", Emmanuel C. Ifeachor and Barrie W. Jervis, Addison-Wesley Publishing Company 1993, ISBN 0-201-54413-X, paragraph 4: "Correlation and Convolution", which is referred to in this connection. It should also be mentioned that in general, it is not important for the application of this invention which method is used to obtain the cross-correlation result.

The rows of the correlation function matrix $C_{x,k}$ formed in the correlation stage represent the cross-correlation of the received signal and the reference code with different phase differences at intervals of one millisecond. As a formula, the correlation function matrix can be expressed as follows:

$$\overline{C}_{x,k} = \begin{bmatrix} m_{x,k}(1) \\ m_{x,k}(2) \\ \vdots \\ m_{x,k}(N) \end{bmatrix} \quad (6)$$

Figure 4:
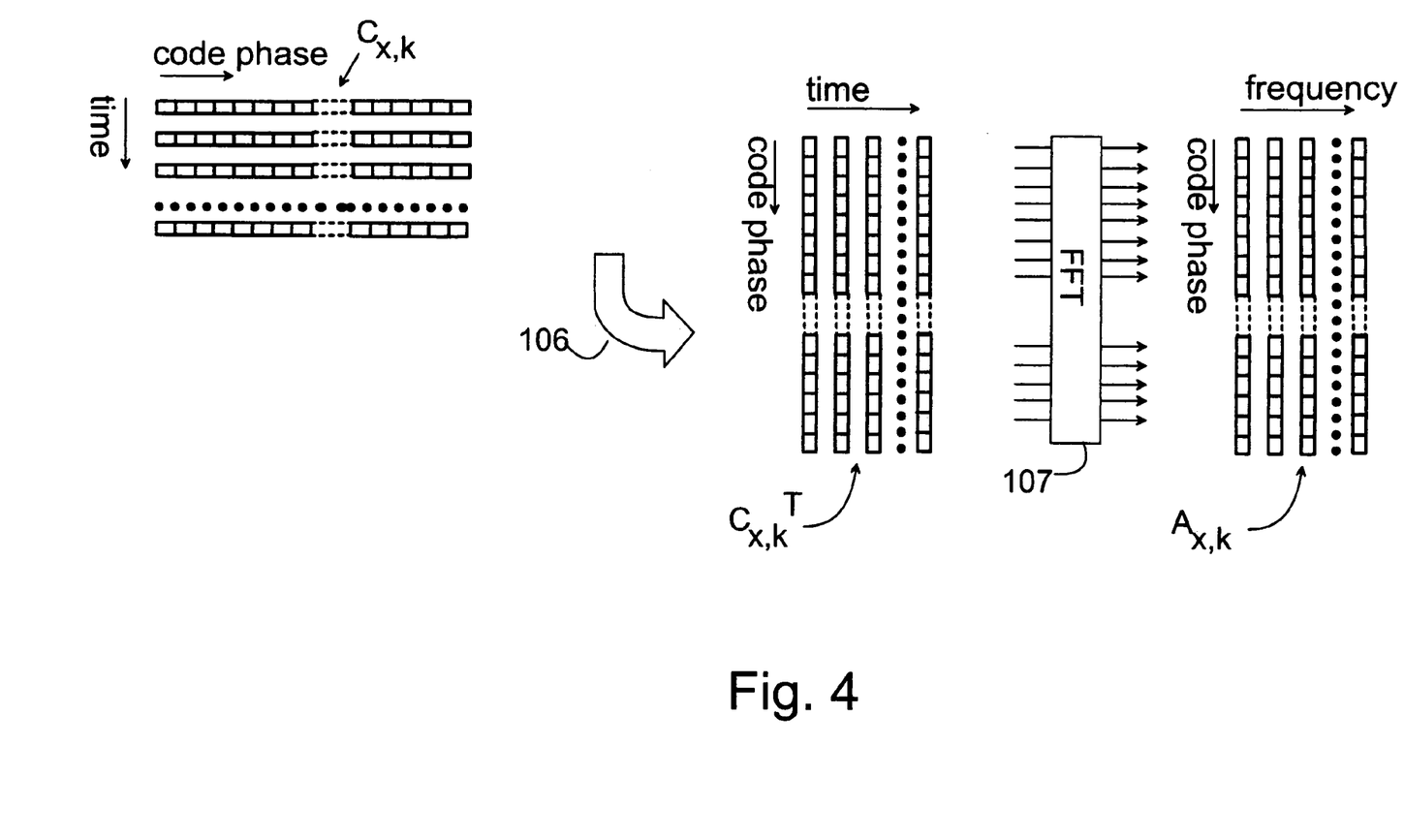
FIG. 4 shows the analysis step of a method according to a preferred embodiment of the invention as a simplified diagram.

In the next phase, that is the analysis phase, the transpose 106 (FIG. 4) of the correlation function matrix $C_{x,k}$ is used, in which the rows represent the signal samples in the time domain in the same manner as in a prior art correlator. Each row corresponds to a certain code phase difference between the received signal and the reference code. A Fourier transform 107 (FIG. 4) is performed on each row of the transpose of the correlation function matrix $C_{x,k}$ to form a coherent search matrix $A_{x,k}$, whereby a frequency analysis can be performed to determine the actual frequency shift. This is illustrated by FIG. 4.

$$A_{x,k} = FFT(C_{x,k}^T) \quad (7)$$

In practical applications, it is not necessary to form a transposed matrix from the correlation function matrix in a separate step, but the elements of the stored correlation function matrix $C_{x,k}$ are read from memory 16 (FIG. 7) in a different direction, preferably by columns.

Figure 8:
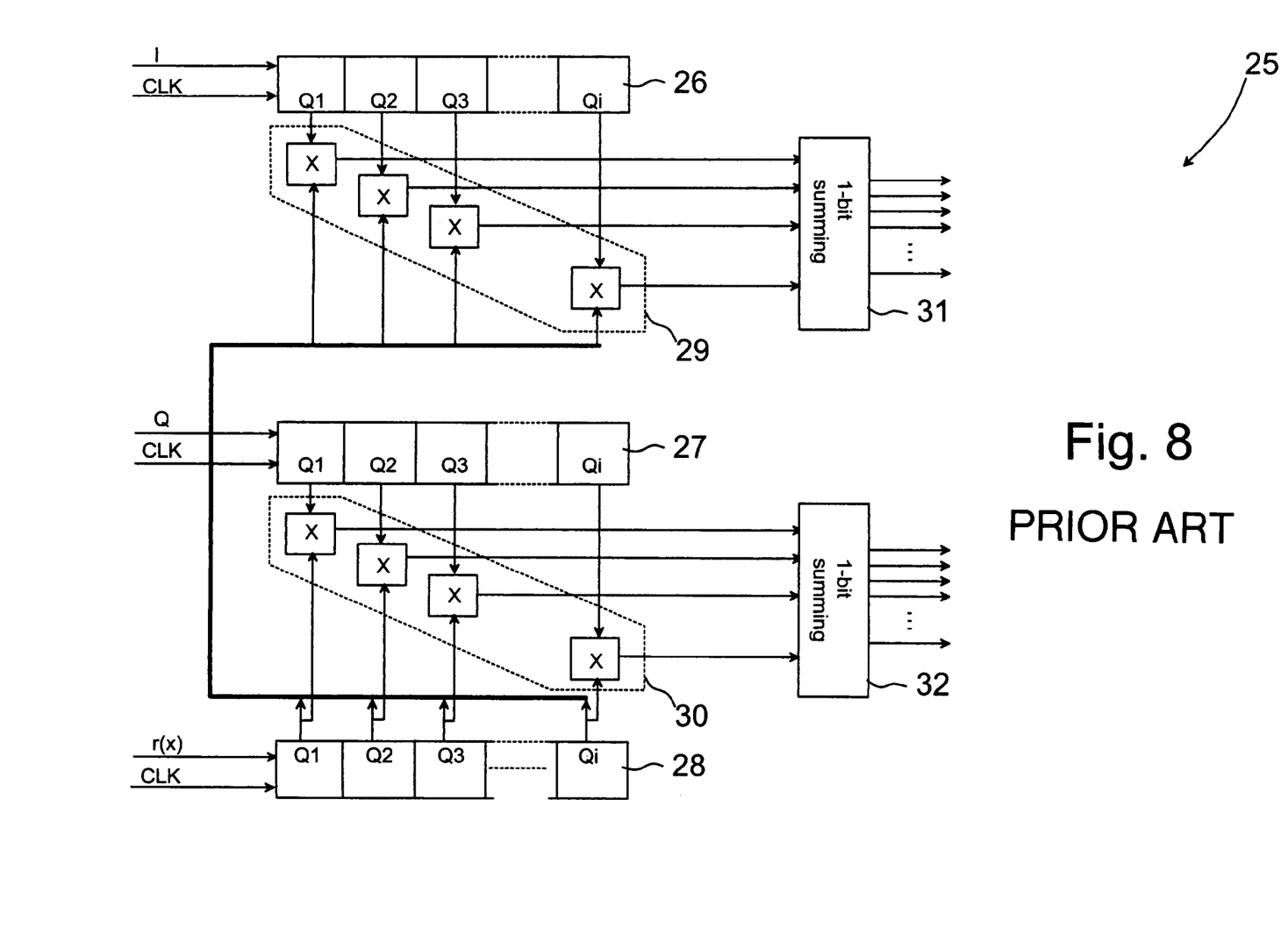
FIG. 8 shows a prior art correlator, which can be used in connection with a method according to a preferred embodiment of the invention.

The correlation function matrix $C_{x,k}$ can also be formed e.g. by using matched filters, in a manner known as such. For example, patent specification U.S. Pat. No. 5,373,531 discloses a correlator 25 implemented using matched filters (FIG. 8), which can be adapted to form the correlation function matrix $C_{x,k}$. The matched filter is formed from three shift registers so that the I-component of the received signal is fed to the first shift register 26, the Q-component of the received signal is led to the second shift register 27, and the reference code corresponding to the code of the satellite is fed to the third shift register 28. The length of the shift registers 26, 27, 28 is preferably the same as the length of the sample vector, which is 1023 bits in the GPS system. When one sample vector has been transferred to the shift register 26, 27, the correlation is performed as follows. An exclusive NOR operation is performed between the bits of the shift register 26 containing the I-component and the bits of the shift register 28 containing the reference code in the first reference block 29, and an exclusive NOR operation is performed between the bits of the shift register 27 containing the Q-component and the bits of the shift register 28 containing the reference code in the second reference block 30. The result of the operation is bit-specific correlation information: if a bit of the received signal (examined in I and Q components) and a corresponding bit of the reference code match, the result is the binary value 1, and if not, the result is the binary value 0. If the signal correlates completely with the reference code, all the bits have the value 1. If none of the bits correlate, all the bits have the value 0. The values produced as the result of the correlation are summed in the first summing block 31 (I-values) and in the second summing block 32 (Q-values), whereby the result is a correlation value $m_{x,k}(i)$ having a certain code delay at a certain time. After one comparison, the reference code is shifted by one, after which a new correlation result is formed. Each correlation result formed according to the above-described method corresponds to one element of a row of the correlation function matrix $C_{x,k}$ (1023 in total). The steps mentioned above are repeated for each sample vector as required, whereby one row of the correlation function matrix $C_{x,k}$ is obtained at each iteration of the calculation.

However, as mentioned above, in the GPS system the signal is modulated with a signal of 50 bit/s, which in practical applications limits the value of the number N. In this case the number N must be selected preferably so that the modulation does not have a substantial effect on the analysis. Furthermore, the optimum value of N is dependent on the window function used in the Fourier transformation. For example, if N is chosen to be equal to 32, the the noise band width is in the order of 30 Hz, which is still a little too large for detecting signals with a strength of the order of −150 dBm at the receiver. For this reason, an optional non-coherent summing step, in which the signal-to-noise ratio is improved, is performed in the synchronization block 6.

Figure 5:
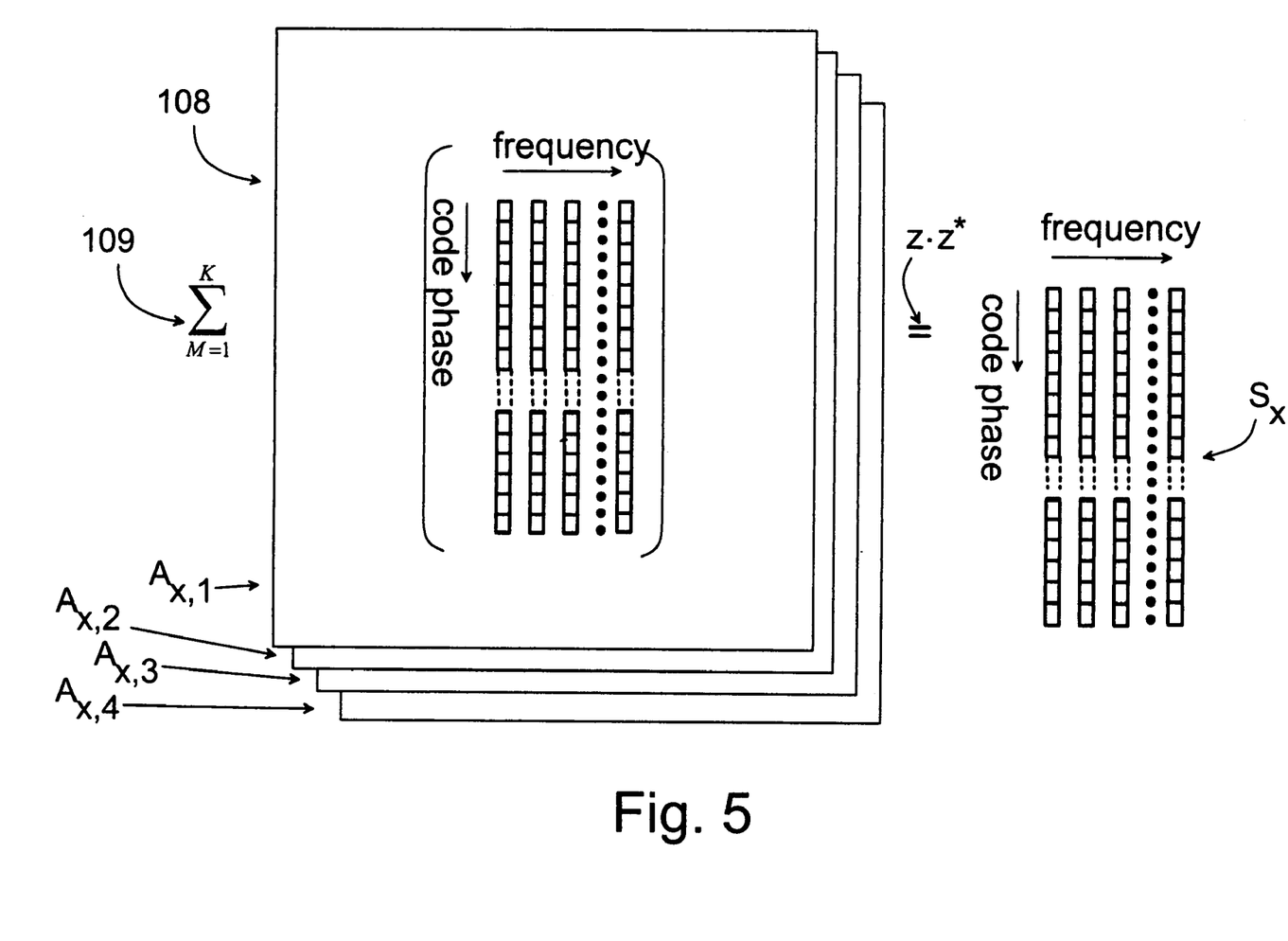
FIG. 5 shows the summing step of a method according to a preferred embodiment of the invention as a simplified diagram.

In order to implement the non-coherent summing step, the sample vector formation step, the correlation step and the analysis step described above are repeated 108 K times (FIG. 5). The number of repetitions K is preferably selected such that the signal-to-noise ratio can be improved sufficiently, in a reasonable time. A coherent search matrix $A_{x,k}$ is formed each time the analysis step is performed, and a non-coherent summing operation is performed on it to form a non-coherent search matrix $S_x$. Preferably, the non-coherent search matrix $S_x$ is formed as follows. Advantageously, either a magnitude value or some other absolute value, such as the square of the magnitude value, is calculated for each of the complex elements $a_{x,k}(i,j)$ of each coherent search matrix $A_{x,k}$. The numerical values calculated from corresponding elements of each non-coherent search matrix are summed, that is, an addition of the matrices is performed, which can be expressed with the formula:

$$S_x = \sum_{k=1}^{K} \begin{bmatrix} |a_{x,k}(1,1)| & L & |a_{x,k}(1,N)| \\ M & O & M \\ |a_{x,k}(1023,1)| & K & |a_{x,k}(1023,N)| \end{bmatrix} \quad (8)$$

In practical applications, a non-coherent search matrix can be formed in at least two ways. In the first alternative implementation, the coherent search matrix formed at each iteration is stored. After the required number of repetition, a non-coherent search matrix is formed by summing the equivalent elements according to Formula 8. In this alternative implementation, memory is required for storing the elements of all the coherent search matrices. According to another alternative implementation, one coherent search matrix is calculated initially, and the values of this matrix are copied as the elements of the non-coherent sum matrix. At each iteration a coherent search matrix is formed, and the values of that matrix are summed with the corresponding elements of the non-coherent search matrix. In this alternative, summing of the equivalent elements is thus performed at each time of iteration. Only one coherent search matrix is thus stored, whereby less memory is needed than in the first alternative.

Figure 6:
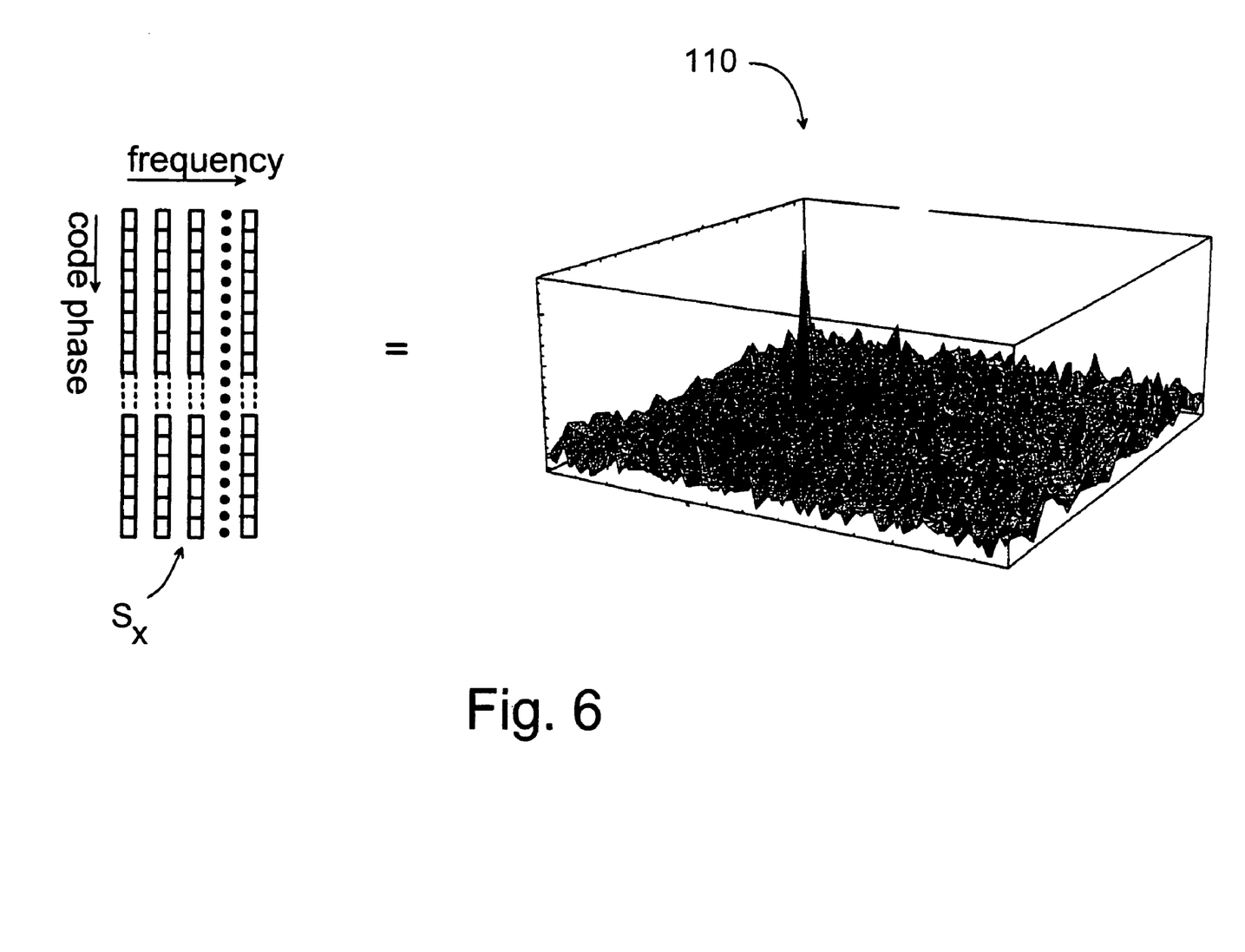
FIG. 6 shows the decision step of a method according to a preferred embodiment of the invention as a simplified diagram.

After the required number of iterations have been performed, the values of the elements $s_x(i,j)$ of the non-coherent search matrix $S_x$ are examined in the determination step, in an attempt to find 110 a value which exceeds the preceding threshold value and is clearly greater than the other values. If such a value like this is found, it represents the code phase difference and frequency deviation, because it is probably a signal transmitted by a satellite. If the signal is not transmitted by a satellite, but consists of noise or other incidental interference signals, no remarkable correlation peaks should arise. The code phase difference is apparent from the row index of the highest value, and correspondingly the frequency deviation is represented by the column index. The example of FIG. 6 illustrates a situation in which a value, which is clearly larger than the other values, has been found. If, on the other hand, no such value is found in the non-coherent search matrix $S_x$, that is, a signal transmitted by the searched for satellite was probably not received in the frequency range examined, the frequency range to be examined is changed, and the previously described steps are carried out to form a new non-coherent search matrix. By this method, the whole range of 6 kHz can be examined by repeating the steps described above as many times as is required.

When required, the previously described steps can be repeated for the whole frequency range to be examined, and the non-coherent search matrices formed for different iterations or only ranges containing possible peaks can be stored before searching for the largest correlation peak. In this way the possibility of false interpretation can be reduced for example in such a situation where the threshold value has been set too low and a spurious signal can cause a false interpretation.

If devices were available, which could identify the code phase and frequency deviation of signals, with a strength in the range of −150 dBm, the frequency range would have to be scanned in ranges tens of Hertz in width, before even an attempt could be made to determine the phase and the frequency deviation. Using the present invention, it is possible to scan the frequency range in ranges of hundreds of Hertz in width, that is, much faster than using prior art receivers.

Once the correct frequency deviation and code phase have been determined, the receiver can be set into tracking mode. Reception of data is unlikely to be successful for very weak signals and in this case, in a manner known as such, it may be necessary to rely on data received via mobile telephone network, for example. In this case distance measurement is still possible, but with reduced accuracy. Tracking mode is set by changing the switches (FIG. 1) to the second position, whereby received information is fed to code tracking block 11, in which a feedback connection is also provided to enable fine adjustment of the frequency of the numerically controlled oscillator 5.

For calculating the location, the receiver performs the signal reception preferably on the basis of signals received from at least four satellites. In this case the previously described synchronization process is repeated as required on the basis of each satellite signal, whereupon the code of the satellite with which synchronization is performed is selected as the reference sequence r(x).

Most of the blocks required for the implementation of the method can be implemented for example in a digital signal processor (not shown). Either hardware-based solutions or software implementations of the digital signal processor can be used to perform FFT transformations. In addition, a control element, preferably a microprocessor or the like can be used to control the operation of the receiver.

Figure 7:
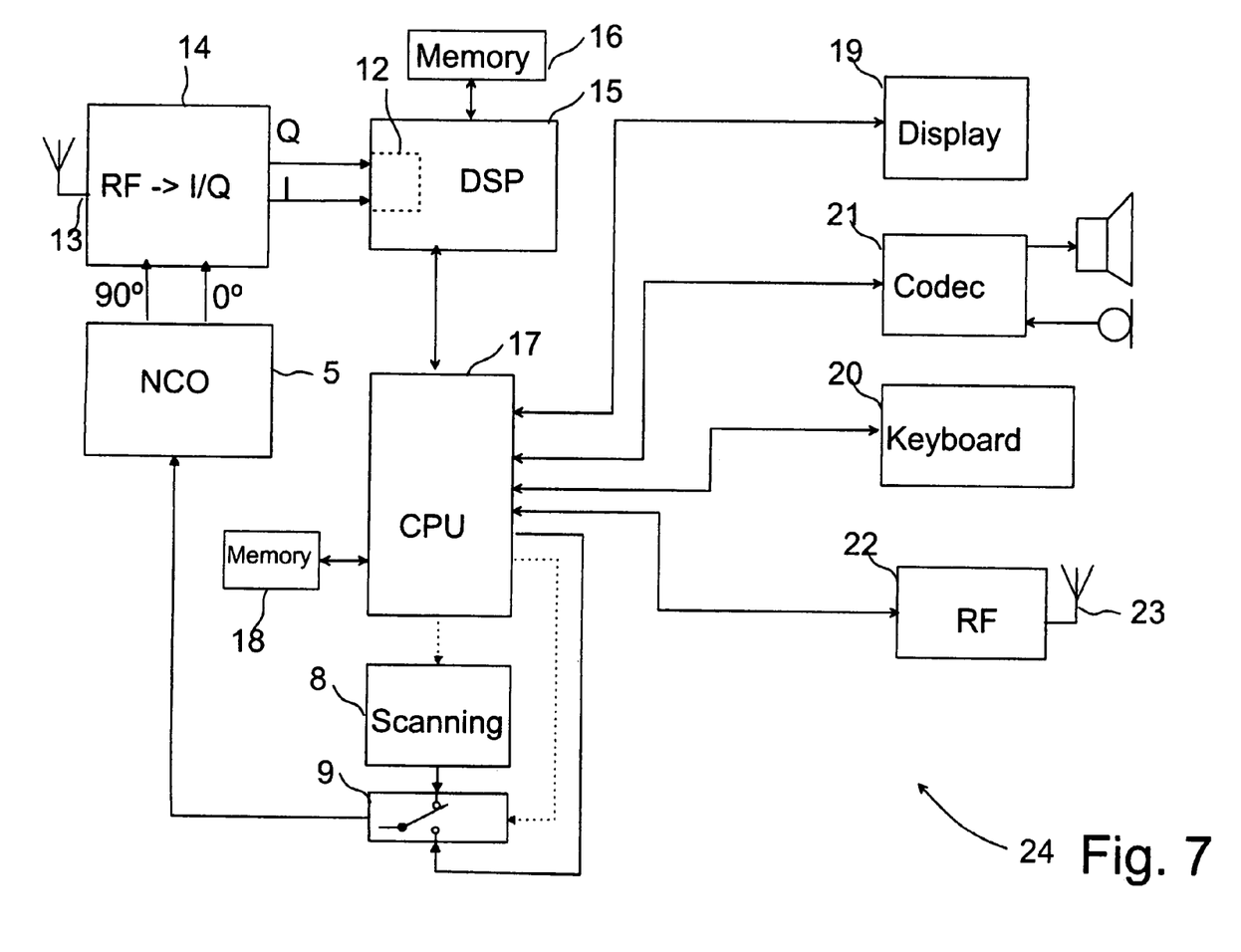
FIG. 7 shows an electronic device according to a preferred embodiment of the invention as a simplified block diagram.

An electronic device 24 according to a preferred embodiment of the invention, comprising a mobile station and a positioning receiver, is shown in FIG. 7. A first antenna 13 is used for the reception of the signal transmitted by the positioning satellites. The received signal is applied to a first radio part 14, in which the signal is down-converted and digitized. The first radio part comprises, among other things, the transformation block 2, digitizing block 3 and multiplier block 4 of the receiver shown in FIG. 1. The digitized signal, which at this stage preferably comprises I and Q components, is applied to the digital signal processing unit 15, in which, among other things, sample vectors are formed in the sample vector formation block 12. The samples are saved in the first memory means 16, which comprises, for example, a read/write memory and preferably also read only memory and/or non-volatile read/write memory for storing the program code of the digital signal processing unit 15. In this embodiment, among other things, the functions of the synchronization block 6, such as the formation of the correlation function matrix $C_{x,k}$ using, for example, Fourier transformers FFT1, FFT2, . . . , FFTN and/or matched filters are implemented in signal processing unit 15. Preferably, formation of the coherent search matrix $A_{x,k}$ and non-coherent summing step are also performed in the digital signal processing unit 15. The digital signal processing unit 15 transmits information about the calculated phase difference and the frequency deviation to the processor block 17, which comprises, for example, a microprocessor and I/O logic. The processor block 17 controls the scanning block 8 and the first switch 9. Preferably, the code tracking block 11 is at least partly implemented as program instructions of the processor block. The second memory means 18 is used as the data and program memory of the processor block 17. It is obvious that the first memory means 16 and the second memory means 18 can also comprise common memory. Positioning information can be shown to the user on the display 19.

Operations of the mobile station are also implemented in the application software of the processor block 17. Thus, the display 19 can be used to present telephone call information in a manner known as such. The user can control the positioning receiver and the mobile station using the keyboard 20, t. The coding and decoding of audio signals is performed by means of a codec 21. The radio part 22 and the second antenna 23 of the mobile station are also shown in FIG. 7.

The present invention is not limited to the previously described embodiments only, but can be modified without departing from the scope defined by the attached claims.

The invention claimed is:

1. A method for synchronizing a receiver with a transmitted code-modulated spread spectrum signal, the method comprising performing a search in frequency versus code-phase space to determine a carrier frequency shift of the code-modulated spread spectrum signal received at the receiver and a code phase of a code used in modulation of the code-modulated spread spectrum signal, the search including:

1). performing a correlation between a set of sample vectors formed from the received code-modulated spread spectrum signal and a reference code to produce a set of correlation results, the reference code corresponding to the code used in modulation of the code-modulated spread spectrum signal;

2). forming a correlation function matrix from said set of correlation results said correlation function matrix comprising the correlation results of a correlation between the set of sample vectors and the reference code with different phase differences for each sample vector;

3). performing a time-to-frequency domain transformation on a basis of a transpose of said correlation function matrix to form a coherent search matrix; and 4). determining the carrier frequency shift of the code-modulated spread spectrum signal received at the receiver and the code phase of the code used in modulation of the code-modulated spread spectrum signal by examining values of elements of said coherent search matrix.

2. A method according to claim 1, comprising determining the carrier frequency shift of the code-modulated spread spectrum signal received at the receiver and the code phase of the code used in modulation of the code-modulated spread spectrum signal by examining the values of elements of said coherent search matrix to identify a largest value.

3. A method according to claim 1, comprising specifying a threshold value and using values of elements of the coherent search matrix that exceed said threshold value to determine said carrier frequency shift and code phase.

4. A method according to claim 1, comprising repeating steps (1) to (3) of claim 1 to form at least two coherent search matrices, and performing a summing step in which a non-coherent search matrix is formed by summing non-coherently the values of corresponding elements of the coherent search matrices formed at each repetition, and using said non-coherent search matrix to determine the carrier frequency shift of the code-modulated spread spectrum signal received at the receiver and the code phase of the code used in modulation of the code-modulated spread spectrum signal.

5. A method according to claim 4, comprising determining the carrier frequency shift of the code-modulated spread spectrum signal received at the receiver and the code phase of the code used in modulation of the code-modulated spread spectrum signal by examining the values of elements of the non-coherent search matrix to identify a largest value.

6. A method according to claim 4, comprising specifying a threshold value and using magnitude values of elements of the non-coherent search matrix that exceed said threshold to determine the carrier frequency shift of the code-modulated spread spectrum signal received at the receiver and the code phase of the code used in modulation of the code-modulated spread spectrum signal.

7. A method according to claim 1, comprising forming the correlation function matrix using matched filters.

8. A method according to claim 1, comprising:
performing a time-to-frequency domain transformation of a reversed code corresponding to said reference code;
performing a time-to-frequency domain transformation of each sample vector;
performing a multiplication between the time-to-frequency domain transformation of said reversed code and the time-to-frequency transformation of each sample vector to form a set of multiplication results;
performing a frequency-to-time domain transformation on each multiplication result to produce a set of frequency-to-time domain transformation results; and
forming the correlation function matrix from said set of frequency-to-time domain transformation results such that each one of said frequency-to-time domain transformation results forms a row of the correlation function matrix.

9. A method according to claim 1, comprising:
performing a time-to-frequency domain transformation of said reference code;
performing a time-to-frequency domain transformation of a reversed vector corresponding to each sample vector;
performing a multiplication between the time-to-frequency domain transformation of said reference code and the time-to-frequency domain transformation of the reversed vector corresponding to each sample vector to form a set of multiplication results;
performing a frequency-to-time domain transformation on each multiplication result to produce a set of frequency-to-time domain transformation results; and
forming the correlation function matrix from said set of frequency-to-time domain transformation results such that each one of said frequency-to-time domain transformation results forms a row of the correlation function matrix.

10. A method according to claim 1, comprising:
performing a time-to-frequency domain transformation of said reference code;
performing a time-to-frequency domain transformation of each sample vector;
forming a complex conjugate from the time-to-frequency domain transformation of the reference code;
performing a multiplication between said complex conjugate and the time-to-frequency domain transformation of each sample vector to produce a set of multiplication results;
performing a frequency-to-time domain transformation on each multiplication result to produce a set of frequency-to-time domain transformation results; and
forming the correlation function matrix from said set of frequency-to-time domain transformation results such that each one of said frequency-to-time domain transformation results forms a row of the correlation function matrix.

11. A method according to claim 1, comprising:
performing a time-to-frequency domain transformation of said reference code;
performing a time-to-frequency domain transformation of each sample vector;
forming a complex conjugate from the time-to-frequency domain transformation of each sample vector;
performing a multiplication between each said complex conjugate and the time-to-frequency domain transformation of the reference code to form a set of multiplication results;
performing a frequency-to-time domain transformation on each multiplication result to produce a set of frequency-to-time domain transformation results; and
forming the correlation function matrix from the frequency-to-time transformation results such that each one of said frequency-to-time domain transformation results forms a row of the correlation function matrix.

12. A method according to claim 8, wherein said time-to-frequency domain transformations are Fourier transformations and said frequency-to-time domain transformation is an inverse Fourier transformation.

13. A method according to claim 1, comprising examining magnitude values of elements of the coherent search matrix to determine the carrier frequency shift of the code-modulated spread spectrum signal received at the receiver and the code phase of the code used in modulation of the code-modulated spread spectrum signal.

14. A method according to claim 1, comprising examining squared magnitude values of elements of the coherent search matrix to determine the carrier frequency shift of the code-modulated spread spectrum signal received at the receiver and the code phase of the code used in modulation of the code-modulated spread spectrum signal.

15. A method according to claim 1, comprising:
    determining a location of the receiver;
    storing the location information; and
    selecting a starting frequency for the search in frequency versus code-phase space by using the location information stored in the receiver.

16. A method according to claim 1, comprising receiving code-modulated spread spectrum signals transmitted by two or more satellites at the receiver and performing steps (1) to (4) of claim 1 on the signal transmitted by each of said satellites.

17. A receiver comprising a synchronization unit for synchronizing the receiver with a transmitted code-modulated spread spectrum signal by performing a search in frequency versus code-phase space to determine a carrier frequency shift of the code-modulated spread spectrum signal received at the receiver and a code phase of a code used in modulation of the code-modulated spread spectrum signal, wherein the synchronization unit is arranged to:
    1). perform a correlation between a set of sample vectors formed from the received code-modulated spread spectrum signal and a reference code to produce a set of correlation results, the reference code corresponding to a code used in modulation of the code-modulated spread spectrum signal;
    2). form a correlation function matrix from said set of correlation results, said correlation function matrix comprising the correlation results of a correlation between the set of sample vectors and the reference code with different phase differences for each sample vector;
    3). perform a time-to-frequency domain transformation on a basis of a transpose of said correlation function matrix to form a coherent search matrix; and
    4). determine the carrier frequency shift of the code-modulated spread spectrum signal received at the receiver and the code phase of the code used in modulation of the code-modulated spread spectrum signal by examining values of elements of said coherent search matrix.

18. A receiver according to claim 17, wherein the synchronization unit is arranged to determine the carrier frequency shift of the code-modulated spread spectrum signal received at the receiver and the code phase of the code used in modulation of the code-modulated spread spectrum signal by examining the values of elements of said coherent search matrix to identify a largest value.

19. A receiver according to claim 17, wherein the synchronization unit is arranged to specify a threshold value and to compare said threshold value and the values of said coherent search matrix to determine said carrier frequency shift and code phase.

20. A receiver according to claim 17, wherein the synchronization is arranged repeat operations (1) to (3) of claim 17 to form at least two coherent search matrices and to perform a summing operation to form a non-coherent search matrix by summing non-coherently the values of corresponding elements of the coherent search matrices formed at each repetition and to use said non-coherent search matrix to determine the carrier frequency shift of the code-modulated spread spectrum signal received at the receiver and the code phase of the code used in modulation of the code-modulated spread spectrum signal.

21. A receiver according to claim 20, wherein the synchronization unit is arranged to determine the carrier frequency shift of the code-modulated spread spectrum signals and the code phase of the code used in modulation of the code-modulated spread spectrum signal by examining the values of elements of the non-coherent search matrix to identify a largest value.

22. A receiver according to claim 20, wherein the synchronization unit is arranged to specify a threshold value and to compare said threshold value with values of elements of said non-coherent search matrix to determine the carrier frequency shift of the code modulated spread spectrum signal received at the receiver and the code phase of the code used in modulation of the code-modulated spread spectrum signal.

23. A receiver according to claim 17, comprising at least one matched filter wherein the synchronization unit is arranged to form the correlation function matrix from the output of said at least one matched filter.

24. A receiver according to claim 17, wherein the synchronization unit is arranged to:
    perform a time-to-frequency domain transformation of a reversed code corresponding to said reference code;
    perform a time-to-frequency domain transformation of each sample vector;
    perform a multiplication between the time-to-frequency domain transformation of said reversed code and the time-to-frequency domain transformation of each sample vector to form a set of multiplication results;
    perform a frequency-to-time domain transformation on each multiplication result to produce a set of frequency-to-time domain transformation results; and
    form the correlation function matrix from said set of frequency-to-time domain transformation results such that each one of said frequency-to-time domain transformation results forms a row of the correlation function matrix.

25. A receiver according to claim 17, wherein the synchronization unit is arranged to:
    perform a time-to-frequency domain transformation of said reference code;
    perform a time-to-frequency domain transformation of a reversed vector corresponding to each sample vector;
    perform a multiplication between the time-to-frequency domain transformation of said reference code and the time-to-frequency domain transformation of the reversed vector of each sample vector to form a set of multiplication results;
    perform a frequency-to-time domain transformation on each multiplication result to produce a set of frequency-to-time domain transformation results; and
    form the correlation function matrix from said set of frequency-to-time domain transformation results such that each one of said frequency-to-time domain transformation results forms a row of the correlation function matrix.

26. A receiver according to claim 17, wherein the synchronization unit is arranged to:
    perform a time-to-frequency domain transformation of said reference code;
    perform a time-to-frequency domain transformation of each sample vector;

form a complex conjugate from the time-to-frequency domain transformation of the reference code;

perform a multiplication between said complex conjugate and the time-to-frequency domain transformation of each sample vector to form a set of multiplication results;

perform a frequency-to-time domain transformation on each multiplication result to produce a set of frequency-to-time domain transformation results; and means (15) for to form the correlation function matrix from said set of frequency-to-time domain transformation results such that each one of said frequency-to-time domain transformation results forma a row of the correlation function matrix.

27. A receiver according to claim 17, wherein the synchronization unit is arranged to:

perform a time-to-frequency domain transformation of said reference code;

perform a time-to-frequency domain transformation of each sample vector;

form a complex conjugate from the time-to-frequency domain transformation of each sample vector;

perform a multiplication between each said complex conjugate and the time-to-frequency domain transformation of the reference code to form a set of multiplication results;

perform a frequency-to-time domain transformation on each multiplication result to produce a set of frequency-to-time domain transformation results; and form the correlation function matrix from the frequency-to-time domain transformation results such that each one of said frequency-to-time domain transformation results forms a row of the correlation function matrix.

28. A receiver according to claim 24, wherein said time-to-frequency domain transformations are Fourier transformations and said frequency-to-time domain transformation is an inverse Fourier transformation.

29. A receiver according to claim 17, wherein the synchronization unit is arranged to examine magnitude values of the elements of the coherent search matrix to determine the carrier frequency shift of the code-modulated spread spectrum signal received at the receiver and the code phase of the code used in modulation of the code-modulated spread spectrum signal.

30. A receiver according to claim 17, wherein the synchronization unit is arranged to examine squared magnitude values of elements of the coherent search matrix to determine the carrier frequency shift of the code-modulated spread spectrum signal received at the receiver and the code phase of the code used in modulation of the code-modulated spread spectrum signal.

31. A receiver according to claim 17, wherein the receiver is arranged to determine a location of the receiver, and the synchronization unit is arranged to select a starting frequency for the search in frequency versus code-phase space in dependence on the location of the receiver.

32. An electronic device comprising a positioning receiver, the positioning receiver comprising a synchronization unit for synchronizing the positioning receiver with a transmitted code-modulated spread spectrum signal by performing a search in frequency versus code-phase space to determine a carrier frequency shift of the code-modulated spread spectrum signal received by the positioning receiver and a code phase of a code used in modulation of the code-modulated spread spectrum signal, wherein the synchronization unit is arranged to:

1). perform a correlation between a set of sample vectors formed from the received code-modulated spread spectrum signal and a reference code to produce a set of correlation results, the reference code corresponding to a code used in modulation of the code-modulated spread spectrum signal;

2). form a correlation function matrix from said set of correlation results, said correlation function matrix comprising the correlation results of a correlation between the set of sample vectors and the reference code with different phase differences for each sample vector;

3). perform a time-to-frequency domain transformation on a basis of a transpose of said correlation function matrix to form a coherent search matrix; and 4). determine the carrier frequency shift of the code-modulated spread spectrum signal received by the positioning receiver and the code phase of the code used in modulation of the code-modulated spread spectrum signal by using examining values of elements of the coherent search matrix.

33. An electronic device according to claim 32, wherein the positioning receiver is arranged to determine a location of the electronic device and the synchronization unit is arranged to select a starting frequency for the search in frequency versus code-phase space in dependence on the location of the electronic device.

34. An electronic device according to claim 32, including a mobile telephone.

35. An electronic device according to claim 32, wherein the electronic device is arranged to retrieve information for use in determining the location of the electronic device from a mobile communication network.

36. A method according to claim 1, comprising determining the carrier frequency shift of the code-modulated spread spectrum signal received at the receiver and the code phase of the code used in modulation of the code-modulated spread spectrum signal substantially simultaneously by examining values of elements of said coherent search matrix.

37. A method according to claim 1, comprising searching for the carrier frequency shift of the code-modulated spread spectrum signal received at the receiver within a predetermined frequency range of the frequency versus code-phase space.

38. A method according to claim 1, wherein the code used in modulation of said code-modulated spread spectrum signal comprises a predetermined number of values and that the number of samples in each of said set of sample vectors is equal to the number of values in the code used in the modulation of the code-modulated spread spectrum signal.

39. A method according to claim 1, comprising forming said set of sample vectors from the spread spectrum signal such that the last sample of any one of said set of sample vectors and the first sample of the immediately following one of said set of sample vectors are consecutive samples of the code-modulated spread spectrum signal.

40. A method according to claim 1, comprising searching for the carrier frequency shift of the code-modulated spread spectrum signal received at the receiver within a set of frequency ranges of the frequency versus code-phase space.

41. A method according to claim 40, wherein said set of frequency ranges encompasses all frequencies within the frequency versus code-phase space.

42. A method according to claim 40, comprising performing steps (1) to (3) of claim 1 within each of said set of frequency ranges to form a set of coherent search matrices, each one of said set of coherent search matrices corresponding to a given one of said set of frequency ranges, and determining the carrier frequency shift of the code-modulated spread spectrum signal received at the receiver and the code phase of the code used in modulation of the code-modulated spread spectrum signal by examining values of elements from more than one of said set of coherent search matrices.

43. A method according to claim 1, comprising specifying a threshold value and using magnitude values of elements of the coherent search matrix that exceed said threshold value to determine the carrier frequency shift of the code-modulated spread spectrum signal received at the receiver and the code phase of the code used in modulation of the code-modulated spread spectrum signal.

44. A method according to claim 42, comprising determining the carrier frequency shift of the code-modulated spread spectrum signal received at the receiver and the code phase of the code used in modulation of the code-modulated spread spectrum signal by examining values of elements of more than one of said set of coherent search matrices to identify a largest magnitude value.

45. A method according to claim 8, comprising transposing the correlation function matrix and forming the coherent search matrix by performing a time-to-frequency domain transformation on the rows of said transpose of the correlation function matrix.

46. A method according to claim 9, comprising transposing the correlation function matrix and forming the coherent search matrix by performing a time-to-frequency domain transformation on the rows of said transpose of the correlation function matrix.

47. A method according to claim 10, comprising transposing the correlation function matrix and forming the coherent search matrix by performing a time-to-frequency domain transformation on the rows of said transpose of the correlation function matrix.

48. A method according to claim 11, comprising transposing the correlation function matrix and forming the coherent search matrix by performing a time-to-frequency domain transformation on the rows of said transpose of the correlation function matrix.

49. A method according to claim 9, wherein said time-to-frequency domain transformations are Fourier transformations and said frequency-to-time domain transformation is an inverse Fourier transformation.

50. A method according to claim 10, wherein said time-to-frequency domain transformations are Fourier transformations and said frequency-to-time domain transformation is an inverse Fourier transformation.

51. A method according to claim 11, wherein said time-to-frequency domain transformations are Fourier transformations and said frequency-to-time domain transformation is an inverse Fourier transformation.

52. A receiver according to claim 17, wherein the synchronization unit is arranged to determine the carrier frequency shift of the code-modulated spread spectrum signal received at the receiver and the code phase of the code used in modulation of the code-modulated spread spectrum signal substantially simultaneously by examining values of elements of said coherent search matrix.

53. A receiver according to claim 17, wherein the synchronization unit is arranged to search for the carrier frequency shift of the code-modulated spread spectrum signal received at the receiver within a predetermined frequency range of the frequency versus code-phase space.

54. A receiver according to claim 17, wherein the code used in modulation of said code-modulated spread spectrum signal comprises a predetermined number of values and that the number of samples in each of said set of sample vectors is equal to the number of values in the code used in the modulation of the code-modulated spread spectrum signal.

55. A receiver according to claim 17, wherein the receiver is arranged to form said set of sample vectors from the code-modulated spread spectrum signal such that the last sample of any one of said set of sample vectors and the first sample of the immediately following one of said set of sample vectors are consecutive samples of the code-modulated spread spectrum signal.

56. A receiver according to claim 17, wherein the synchronization unit is arranged to search for the carrier frequency shift of the code-modulated spread spectrum signal received at the receiver within a set of frequency ranges of the frequency versus code-phase space.

57. A receiver according to claim 56, wherein said set of frequency ranges encompasses all frequencies within the frequency versus code-phase space.

58. A receiver according to claim 56, wherein the synchronization unit is arranged to perform operations (1) to (3) of claim 17 within each of said set of frequency ranges to form a set of coherent search matrices, each one of said set of coherent search matrices corresponding to a given one of said set of frequency ranges, and to determine the carrier frequency shift of the code-modulated spread spectrum signal received at the receiver and the code phase of the code used in modulation of the code-modulated spread spectrum signal by examining values of elements from more than one of said set of coherent search matrices.

59. A receiver according to claim 17, wherein the synchronization unit is arranged to specify a threshold value and to use magnitude values of elements of the coherent search matrix that exceed said threshold value to determine the carrier frequency shift of the code-modulated spread spectrum signal received at the receiver and the code phase of the code used in modulation of the code-modulated spread spectrum signal.

60. A receiver according to claim 58, wherein the synchronization unit is arranged to determine the carrier frequency shift of the code-modulated spread spectrum signal received at the receiver and the code phase of the code used in modulation of the code-modulated spread spectrum signal by examining values of elements of more than one of said set of coherent search matrices to identify a largest magnitude value.

61. A receiver according to claim 25, wherein said time-to-frequency domain transformations are Fourier transformations and said frequency-to-time domain transformation is an inverse Fourier transformation.

62. A receiver according to claim 26, wherein said time-to-frequency domain transformations are Fourier transformations and said frequency-to-time domain transformation is an inverse Fourier transformation.

63. A receiver according to claim 27, wherein said time-to-frequency domain transformations are Fourier transformations and said frequency-to-time domain transformation is an inverse Fourier transformation.

64. A receiver according to claim 24, wherein the synchronization unit is arranged to transpose the correlation function matrix and to form the coherent search matrix by performing a time-to-frequency domain transformation on the rows of said transpose of the correlation function matrix.

65. A receiver according to claim 25, wherein the synchronization unit is arranged to transpose the correlation function matrix and to form the coherent search matrix by performing a time-to-frequency domain transformation on the rows of said transpose of the correlation function matrix.

66. A receiver according to claim 26, wherein the synchronization unit is arranged to transpose the correlation function matrix and to form the coherent search matrix by performing a time-to-frequency domain transformation on the rows of said transpose of the correlation function matrix.

67. A receiver according to claim 27, wherein the synchronization unit is arranged to transpose the correlation function matrix and to form the coherent search matrix by performing a time-to-frequency domain transformation on the rows of said transpose of the correlation function matrix.

* * * * *